US008808909B2

(12) United States Patent
Bosnyak et al.

(10) Patent No.: US 8,808,909 B2
(45) Date of Patent: Aug. 19, 2014

(54) LITHIUM ION BATTERIES USING DISCRETE CARBON NANOTUBES, METHODS FOR PRODUCTION THEREOF AND PRODUCTS OBTAINED THEREFROM

(75) Inventors: Clive P. Bosnyak, Dripping Springs, TX (US); Kurt W. Swogger, Austin, TX (US)

(73) Assignee: Melecular Rebar Design, LLC, Austin, TX (US)

( * ) Notice: Subject to any disclaimer, the term of this patent is extended or adjusted under 35 U.S.C. 154(b) by 0 days.

(21) Appl. No.: 14/128,392

(22) PCT Filed: Jun. 21, 2012

(86) PCT No.: PCT/US2012/043534

§ 371 (c)(1),
(2), (4) Date: Dec. 20, 2013

(87) PCT Pub. No.: WO2012/177865

PCT Pub. Date: Dec. 27, 2012

(65) Prior Publication Data

US 2014/0154577 A1 Jun. 5, 2014

Related U.S. Application Data

(60) Provisional application No. 61/500,560, filed on Jun. 23, 2011.

(51) Int. Cl.
| *H01M 10/052* | (2010.01) |
| *H01M 4/505* | (2010.01) |
| *H01M 4/1391* | (2010.01) |
| *H01M 4/1393* | (2010.01) |
| *H01M 4/131* | (2010.01) |
| *H01M 4/525* | (2010.01) |
| *H01M 10/0525* | (2010.01) |
| *H01M 4/133* | (2010.01) |
| *H01M 4/62* | (2006.01) |
| *H01M 4/1395* | (2010.01) |
| *H01M 4/587* | (2010.01) |
| *H01M 4/134* | (2010.01) |
| *B82Y 99/00* | (2011.01) |

(52) U.S. Cl.
CPC .............. *H01M 4/587* (2013.01); *H01M 4/505* (2013.01); *Y10S 977/742* (2013.01); *H01M 4/1391* (2013.01); *Y02E 60/122* (2013.01); *H01M 4/1393* (2013.01); *H01M 4/131* (2013.01); *H01M 4/525* (2013.01); *H01M 10/0525* (2013.01); *H01M 4/133* (2013.01); *H01M 4/625* (2013.01); *H01M 4/1395* (2013.01); *H01M 4/134* (2013.01); *B82Y 99/00* (2013.01); *Y10S 977/948* (2013.01)
USPC .......................... 429/209; 977/742; 977/948

(58) Field of Classification Search
None
See application file for complete search history.

(56) References Cited

U.S. PATENT DOCUMENTS

| 2011/0104551 A1 | 5/2011 | Yang et al. |
| 2011/0311876 A1 | 12/2011 | Sturgeon et al. |

FOREIGN PATENT DOCUMENTS

| EP | 1665446 | 3/2012 |
| WO | 2009/155267 | 12/2009 |

(Continued)

OTHER PUBLICATIONS

European Patent Office, International Search Report and Written Opinion, PCT Application No. PCT/US2012/043534, Oct. 5, 2012.
European Patent Office, Response to Written Opinion and Demand, PCT Application No. PCT/US2012/043534, Apr. 23, 2013.

(Continued)

*Primary Examiner* — Patrick Ryan
*Assistant Examiner* — Wyatt McConnel
(74) *Attorney, Agent, or Firm* — Jackson Walker L.L.P.

(57) ABSTRACT

Compositions, and methods of obtaining them, useful for lithium ion batteries comprising discrete oxidized carbon nanotubes having attached to their surface lithium ion active materials in the form of nanometer sized crystals or layers. The composition can further comprise graphene or oxygenated graphene.

8 Claims, 3 Drawing Sheets

(56) References Cited

FOREIGN PATENT DOCUMENTS

| WO | 2010/117392 | 10/2010 |
| WO | 2012/083358 | 6/2012 |
| WO | 2013/011516 | 1/2013 |

OTHER PUBLICATIONS

European Patent Office, Second Written Opinion, PCT Application No. PCT/US2012/043534, Jun. 19, 2013.

European Patent Office, International Preliminary Report on Patentability, PCT Application No. PCT/US2012/043534, Sep. 24, 2013.

LITHIUM ION BATTERIES USING DISCRETE CARBON NANOTUBES, METHODS FOR PRODUCTION THEREOF AND PRODUCTS OBTAINED THEREFROM

This application claims priority to U.S. Provisional Patent Application Ser. No. 61/500,560, entitled "LITHIUM ION BATTERIES USING DISCRETE CARBON NANOTUBES, METHODS FOR PRODUCTION THEREOF AND PRODUCTS OBTAINED THEREFROM," filed on Jun. 23, 2011, the entire content of which is hereby incorporated by reference.

FIELD OF THE INVENTION

The present invention relates generally to the field of improved technologies for lithium batteries. In some embodiments, the invention relates to discrete carbon nanotubes having crystals or layers of lithium ion active materials attached to their surface.

BACKGROUND

Lithium batteries are used extensively for portable electronic equipment and are increasingly being used to provide electrical back-up for wind and solar energy. The commercially used lithium ion (Li-ion) rechargeable batteries based on cobalt, nickel or manganese oxides for the cathode materials are known for their poor electrical conductivity and poor electrochemical stability which results in poor cycling (charge/discharge) ability. Olivine structures such as lithium iron phosphate, $LiFePO_4$ or lithium manganese phosphate, $LiMnPO_4$, operate at higher charge and discharge rates, but are still limited by low electrical conductivity and the kinetics of Li-ion diffusion.

Attempts to overcome the above deficiencies have included synthesis of nanosized crystals, termed nanocrystals, of lithium salts as well as mixtures of lithium salts and carbon nanotubes. Even though the mixtures of carbon nanotubes and nanocrystals of lithium salts show improvements in charge/discharge rates, the carbon nanotubes previously employed are not considered to be essentially discrete, i.e. individual uniformly dispersed tubes. Carbon nanotubes as conventionally made by gas phase reaction result in a tangled bundle of tubes with particle diameters ranging from 50 to 200 micrometers. Also, the lithium nanocrystals are not ionically or covalently attached to the surface of the discrete carbon nanotubes to provide for intimate electron transfer and enhanced mechanical strength of the active material. During charging and discharging of conventional lithium ion batteries, the nanocrystals expand and contract. Over a number of cycles, this leads to microcrack formation in the layer of active material and hence to higher internal resistance and decline of the battery performance. With crystals bound to and interconnected with discrete carbon nanotubes the microcrack formation due to severe mechanical vibration, bending, or expansion and contraction will be retarded.

Lithium salts have also been carbon coated with very thin coatings on the nanometer scale to enhance inter-particle electrical conductivity, but the carbon coating can slow the Lithium ion transport and may also react unfavorably with electrolytes over time. The carbon coating is considered to be amorphous in structure and is more likely to react with electrolyte than the crystalline carbon structure of the carbon nanotubes. Likewise, carbon particles have been added to the crystals of lithium salts to enhance inter-particle conductivity but these generally reduce the mechanical strength of dried pastes in the battery leading to cracking and reduced performance over time.

The present invention overcomes the difficulties of low electrical conduction, particularly due to expansion and contraction of the material during charging and discharging of the battery, improved lithium ion transport and mitigation of potentially damaging chemical side reactions by attaching nanosized crystals or nanosized layers of lithium ion active material to the surface of discrete, functionalized and well dispersed carbon nanotubes.

Likewise, for the lithium battery anode materials, active anode materials, such as carbon particles, tin oxide or silicon, can be attached to the discrete carbon nanotube surfaces to provide numerous benefits such as improved capacity, electron and ion conductivity and mechanical strength.

In addition to the discrete carbon nanotube network providing support and spatial stabilization of nanosized particles or layers for cathode or anode material of the lithium battery, other benefits include improved heat transfer media to avoid thermally-induced runaway, structural strength to the paste during manufacturing and high surface area per weight of lithium ion active material to provide good energy density. The uniform dispersion of discrete tubes will also provide a more uniform voltage gradient across the cathode or anode layer, therefore reducing the probability of locally high electrically resistive regions that can cause accelerated decay of performance in that local region.

SUMMARY

One aspect of the invention is a composition useful for lithium ion batteries, comprising discrete carbon nanotubes having attached to their surface lithium ion active materials in the form of nanometer sized crystals or layers. For a cathode, the lithium ion active material comprises a lithium metal salt which may further comprise iron, manganese, cobalt, copper, nickel, vanadium, titanium, or mixtures thereof. The composition can further comprise the lithium metal salt with an olivine crystal structure. For an anode, the lithium ion active material may comprise carbon, tin, silicon, copper, antimony, aluminum, germanium, titanium or mixtures thereof. The discrete carbon nanotubes of the composition preferably have an aspect ratio of 10 to 500 and oxidation levels from 1 to 15 weight percent of the carbon nanotube. The composition can further comprise graphene or oxygenated graphene. In one embodiment, the weight ratio of grapheme to carbon nanotube is in the range of 0.1:99.9 to 99.9:0.1.

Yet another aspect of this invention is a process for the production of discrete carbon nanotubes having attached to their surface lithium ion active materials in the form of nanometer sized crystals or layers, comprising the steps of:
a) selecting carbon nanotubes of aspect ratio 10 to 500 and oxidation level 1 to 15 weight percent,
b) mixing the carbon nanotubes with a high boiling point liquid, optionally with a non-ionic surfactant,
c) optionally sonicating the carbon nanotube liquid mixture,
d) adding reagents in correct balance to synthesize the desired lithium salt,
e) reacting the mixture at the desired temperature to form the lithium salt while sonicating the mixture
f) separating the solid salts from the liquid; and
g) drying and annealing under an inert atmosphere the solid discrete carbon nanotubes with attached lithium salts at sufficient temperature to obtain the olivine crystal structure.

A further aspect of the invention is a process for the production of the discrete carbon nanotubes having attached to their surface lithium ion active materials in the form of nanometer sized crystals or layers, comprising the steps of:
- a) selecting carbon nanotubes of aspect ratio 10 to 500 and oxidation level 1 to 15 weight percent,
- b) mixing the carbon nanotubes and desired lithium salt in a liquid with surfactant.
- c) sonicating the carbon nanotube/lithium salt liquid mixture,
- d) separating the solid salts from the liquid,
- e) drying and annealing under an inert atmosphere the solid discrete carbon nanotubes with attached lithium salts at sufficient temperature to obtain the olivine crystal structure.

An additional aspect of this invention is a composition useful for lithium ion batteries comprising discrete carbon nanotubes having attached to their surface lithium ion active materials in the form of nanometer sized crystals or layers wherein the carbon nanotubes are in a weight ratio of carbon nanotubes to lithium salts of 0.1% to 10%.

Yet another aspect of this invention useful for lithium ion batteries is a composition comprising oxidized carbon nanotubes having attached to their surface lithium ion active materials in the form of nanometer sized crystals or layers wherein the carbon nanotubes are uniformly dispersed without clustering on a dimension scale less than one micrometer.

A further aspect of this invention is a composition useful for lithium ion batteries comprising uniformly dispersible oxidized carbon nanotubes having lithium ion active materials attached to their surface, whether ionically or chemically.

DETAILED DESCRIPTION

Figure 1:
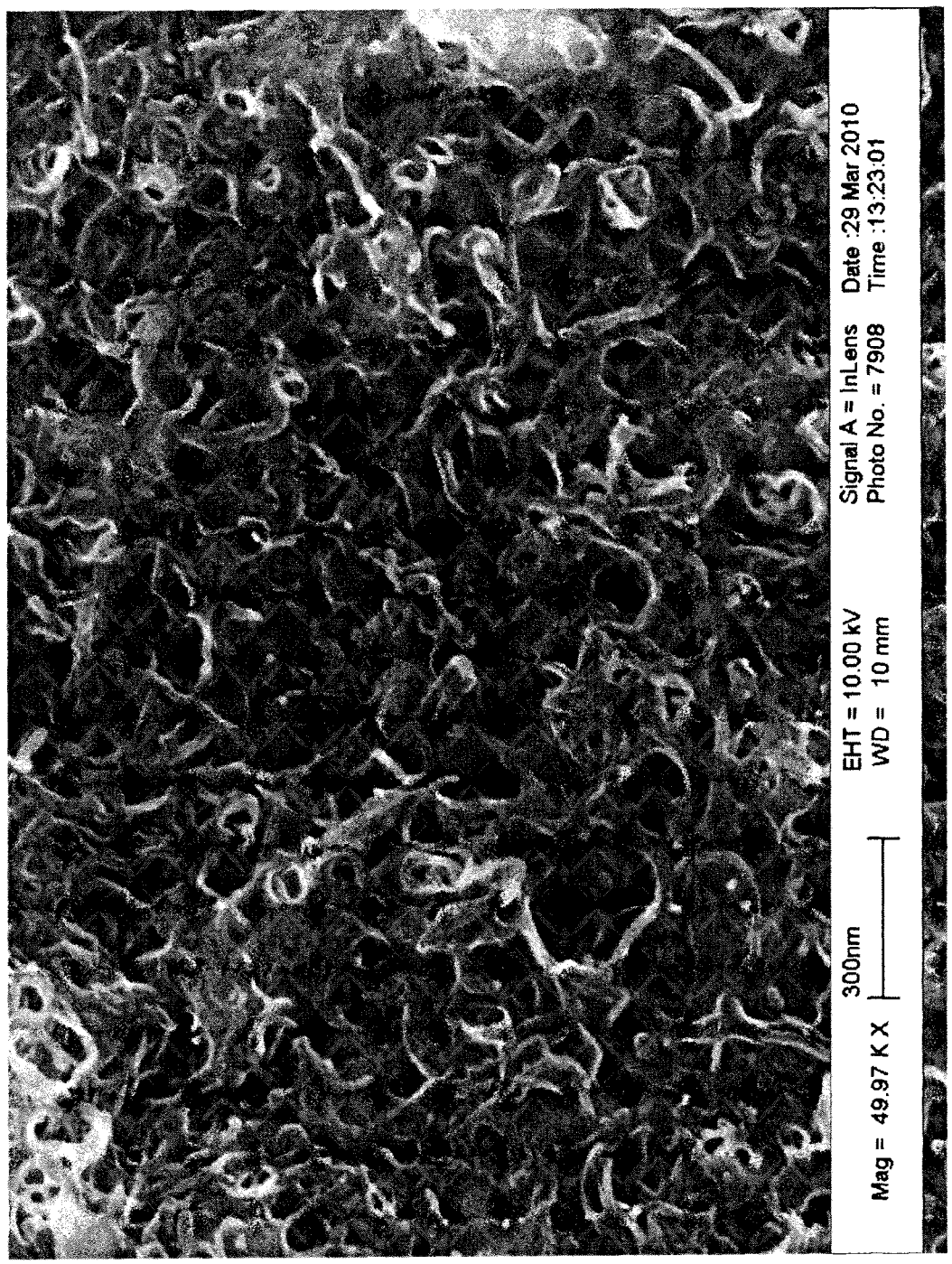
FIG. 1 depicts lithium salt coated as a nanolayer on discrete carbon nanotubes.

The term "carbon nanotubes" as used herein refers to allotropes of carbon with a cylindrical nanostructure. The nanotubes may be single, double or multiwall.

The term "discrete carbon nanotubes" as used herein refers to carbon nanotubes capable of being separated to give individual tubes.

The term "graphene" as used herein refers to individual atomic thickness plates of carbon.

The term "oxidized graphene" as used herein refers to the products of oxidizing graphene plates. The oxidized species are generally at the edges of the graphene plates.

The term "oxidized carbon nanotubes" as used herein refers to the products of oxidizing the carbon nanotubes. Generally the oxidized species are carboxylic, ketone or hydroxyl functionalities.

The term "weight percent" or "percent weight" or "% by weight" as used herein is calculated by dividing the weight of a reagent by the total weight of a mixture to which it is added subsequent to the addition of the reagent. For example, adding 1 gram of a reagent A to 99 grams of a reagent B, thereby forming 100 grams of a mixture A+B would constitute adding 1 weight percent of the reagent A to the mixture.

During the process of making discrete carbon nanotubes (which can be single, double and multiwall configurations), the nanotubes are cut into segments and residual catalyst particles that are interior to the carbon nanotubes as received from the manufacturer are dissolved. This cutting of the tubes helps with exfoliation. The cutting of the tubes reduces the length of the tubes into carbon nanotube segments that are defined here as Molecular Rebar. Proper selection of the carbon nanotube feed stock related to catalyst particle type and distribution in the carbon nanotubes allows more control over the resulting individual tube lengths and overall tube length distribution. A preferred selection is where the internal catalyst sites are evenly spaced and where the catalyst is most efficient. The selection can be evaluated using electron microscopy and determination of the exfoliated tube distribution. Molecular Rebar gives advantageous mechanical and transport properties when added to other materials compared to materials with no Molecular Rebar.

Types of Migratable Ions and Ion Active Materials

The ion active material which can be attached to the discrete carbon nanotubes is defined here as meaning an ion can migrate into or out of the ion ac tike material thereby exchanging electrons. The migrating ion is preferably lithium ion, and is preferably 50 percent by mole of the available migratable ions, more preferably 75 mole percent or higher, most preferably 95 mole percent or higher and can be as high as 100 mole percent of the total migratable ions. Other migratable ions can include magnesium, aluminium, iron, zinc, manganese, sodium, potassium, lead, mercury, silver, gold, nickel, cadmium and the like.

Examples of ion active materials are lithium iron phosphate, lithium manganese phosphate, lithium cobalt oxide, silica, manganese dioxide, cadmium, titanium dioxide and carbon.

The ion active materials can be the same or comprise different active materials. Further, ion species in these ion active materials can be the same, or they can be different. When using a mixture of migratable ions, it preferred that the lithium ions comprise the majority of the ions of the mixture. Mixtures of migratable ions, when used, can be of 2 different ions, or can be three or more different ions in various proportions. In addition, the ion mixture can be varying valence (or oxidation) states of the same ion, such as $Fe^{2+}$ or $Fe^{3+}$.

When mixing ion active materials for attachment to the carbon nanotubes, the mixture may be merely accidental, such as that resulting from either natural states of the ion active material compounds, or the mixture can be an intentional mixing of the different ion active materials, including those in differing chemical or physical state. In some cases comprising migratable ion mixture using lithium ion, the lithium ion may comprise the minority ionic component, of the mix, although this is not usually the preferred configuration. When more than one ion is used, then the ratio of Li ion to other total ions is preferably at least 2:1, or 3:1 or 10:1 and can be as high as 25:1 (mole ratios).

The ion active material attached to the discrete carbon nanotubes can also be useful for applications such as fuel cells, sensors, capacitors, photovoltaics and catalysts.

EXPERIMENTAL EXAMPLES

The following experimental examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Example 1

Discrete Carbon Nanotubes with Attached Copper Oxide Nanoparticles Suitable for a Lithium Ion Battery Anode Material 102 mg of multi-wall carbon nanotubes (CNano, grade C9000) oxidized to about 8 weight percent and aspect ratio about 60 are added to 100 mg copper sulfate, 640 mg sodium EDTA, 15 mg of polyethylene glycol, 568 mg of sodium sulfate and 60 mL of deionized water. The mixture is sonicated for 10 minutes and then heated to 40° C. 3 mL of formaldehyde (37% solution) and 500 mg of sodium hydroxide is added to bring the pH to 12.2. The mixture is stirred for 30 minutes at 85° C. and then filtered using a 5 micron PVDF filter and washed with 200 mL of deionized water. The resultant coated multiwall tubes show a coppery hue color. An electron micrograph shows copper oxide particles of diameter about 50 to 150 nm interconnected by well-dispersed carbon nanotubes.

Example 2

Discrete Carbon Nanotubes with Lithium Iron Phosphate Coated on the Surface of the Tubes. Suitable for a Lithium Ion Battery Cathode Material 0.2 grams of multi-wall carbon nanotubes (CNano, grade C9000) oxidized to about 8 NA eight percent and aspect ratio about 60 are added to 23.5 grams of diethylene glycol and sonicated for 15 minutes. The solution is grey. 1.16 grams of iron acetate dissolved in 4 ml of deionized water is added and the mixture heated under nitrogen, stirring and sonication. After 1 hour at 140° C. a solution of 0.65 grams of lithium acetate and 0.74 grams of ammonium phosphate in 4.2 ml of deionized water is added. The temperature is raised to about 185° C. over 30 minutes, then held at 185° C. for 4 hours. The mixture is cooled to 110° C. and sonicated for 5 minutes followed by further cooling to ambient temperature while stirring. The solids are separated from the mixture by centrifugation followed by ethanol washing. The resultant powder is dried to constant weight vacuo.

The resultant dried powder is determined to have a resistance of 2,000 ohm-cm compared to a commercially obtained sample determined as 19,000 ohm-cm.

Example 3

Lithium iron phosphate obtained commercially is ground with multiwall carbon nanotubes (CNano, grade C9000) oxidized to about 8 weight percent and of aspect ratio about 60, in a mortar and pestle at weight ratios of 5:1 and 1:1 lithium salt to carbon nanotube. Sodium dodecyl sulfate (SDS) is then added at a weight ratio of 0.7:1 compared to the carbon nanotube and deionized water added to resultant mixture to give a 0.5 weight percent solution of carbon nanotubes in the presence of lithium salt and surfactant. The mixture is sonicated for 1 hour, then the solids filtered using a polyvinylidenefluoride filter (0.2 micron), washed with deionized water and dried. A micrograph of the discrete carbon nanotubes coated with lithium iron phosphate is shown in FIG. 1. The results of the resistance of the powders are given in Table 1, units of resistance are ohm-cm.

TABLE 1

| Material | 5:1 Weight ratio Lithium salt:carbon nanotube | 1:1 Weight ratio Lithium salt:carbon nanotube |
|---|---|---|
| Dry mix | 860 | 26 |
| Coated | 46.2 | 6.9 |
| Improvement of coating | 18.6 X | 3.8X |

Example 4

Preparation of Lithium Manganese Phosphate in the Presence of Five Percent by Weight Oxidized Carbon Nanotubes 37.439 g manganese II acetate is dissolved in 5.0 ml of water and added to 589 mL of diethylene glycol (DEG) already in the reaction vessel. The mixture is then heated to a target temperature of 140° C. under stirring and gentle nitrogen flow to distill off the water. 1.119 g of oxidized carbon nanotubes (originally CNano, grade C9000, average diameter 13 nm) nanotubes having an oxidation of 4% and average aspect ratio of 60 are dispersed in 222.2 mL diethylene glycol (0.5% w/v) using sonication while stirring for 30 minutes. Additionally, 14.4434 g lithium acetate and 16.4497 g and ammonium dihydrogen phosphate are dissolved in 90 mL of water. The dispersion of oxidized carbon nanotubes, lithium acetate and ammonium dihydrogen phosphate are added to the reaction medium while stirring, and with sonication. Heating is increased to maintain a target temperature of 180 degrees centigrade for 3 hours, while maintaining constant nitrogen flow. Following the end of the reaction, heating and sonication are turned off while stirring and nitrogen are maintained as the system cools to room temperature.

Figure 2:
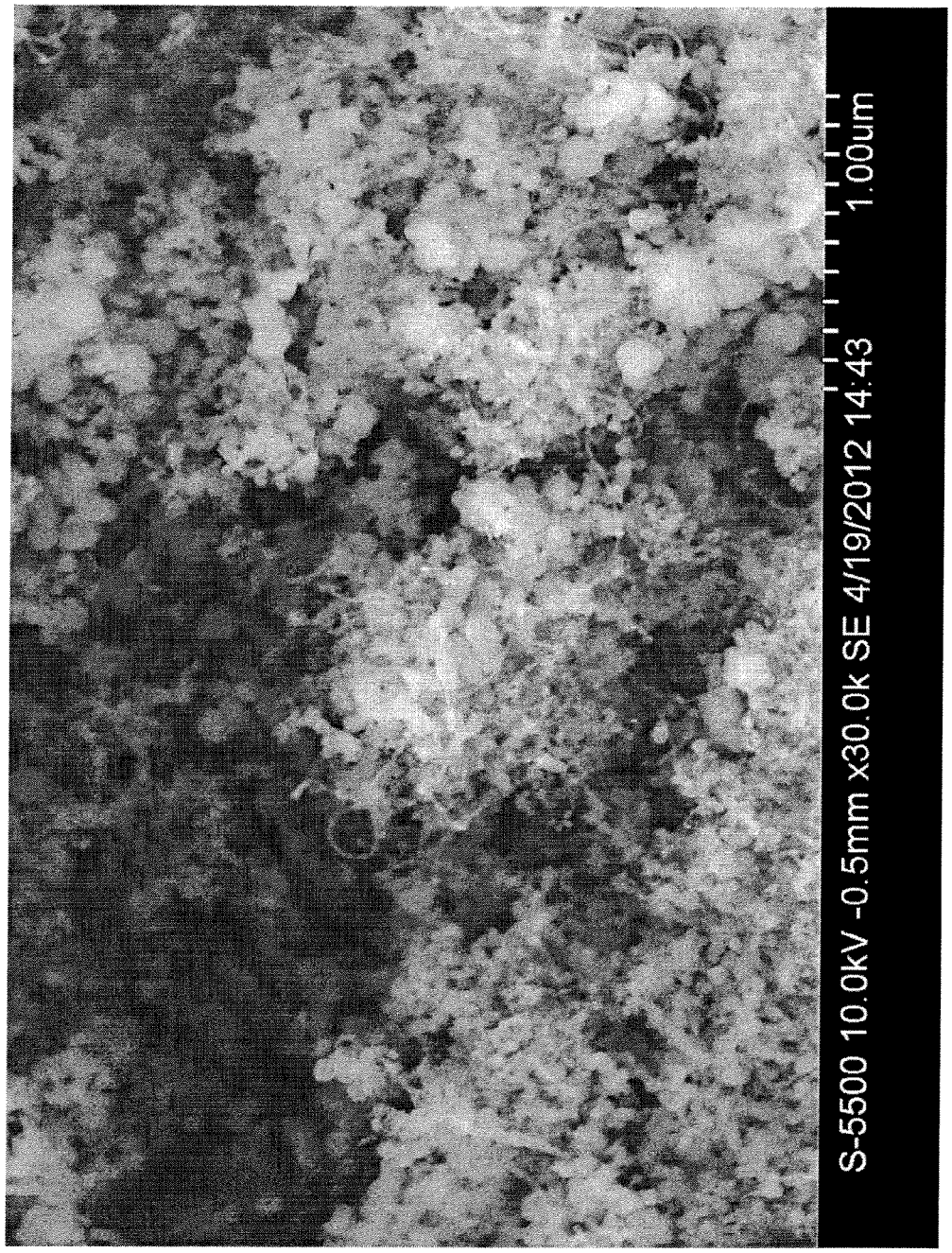
FIG. 2 shows $LiMnO_4$ with 5% oxidized carbon nanotubes of this invention.

The product is a highly viscous, dark-grey colored fluid. The carbon nanotube coated with lithium manganese phosphate is centrifuged and the solids washed with anhydrous ethanol three times. An electron micrograph of the product is shown in FIG. 2. In FIG. 2 the majority of tubes are shown to have coatings of lithium manganese phosphate about 20-40 nm thick. The coatings are not smooth as seen in Example 1.

Example 5

Figure 3:
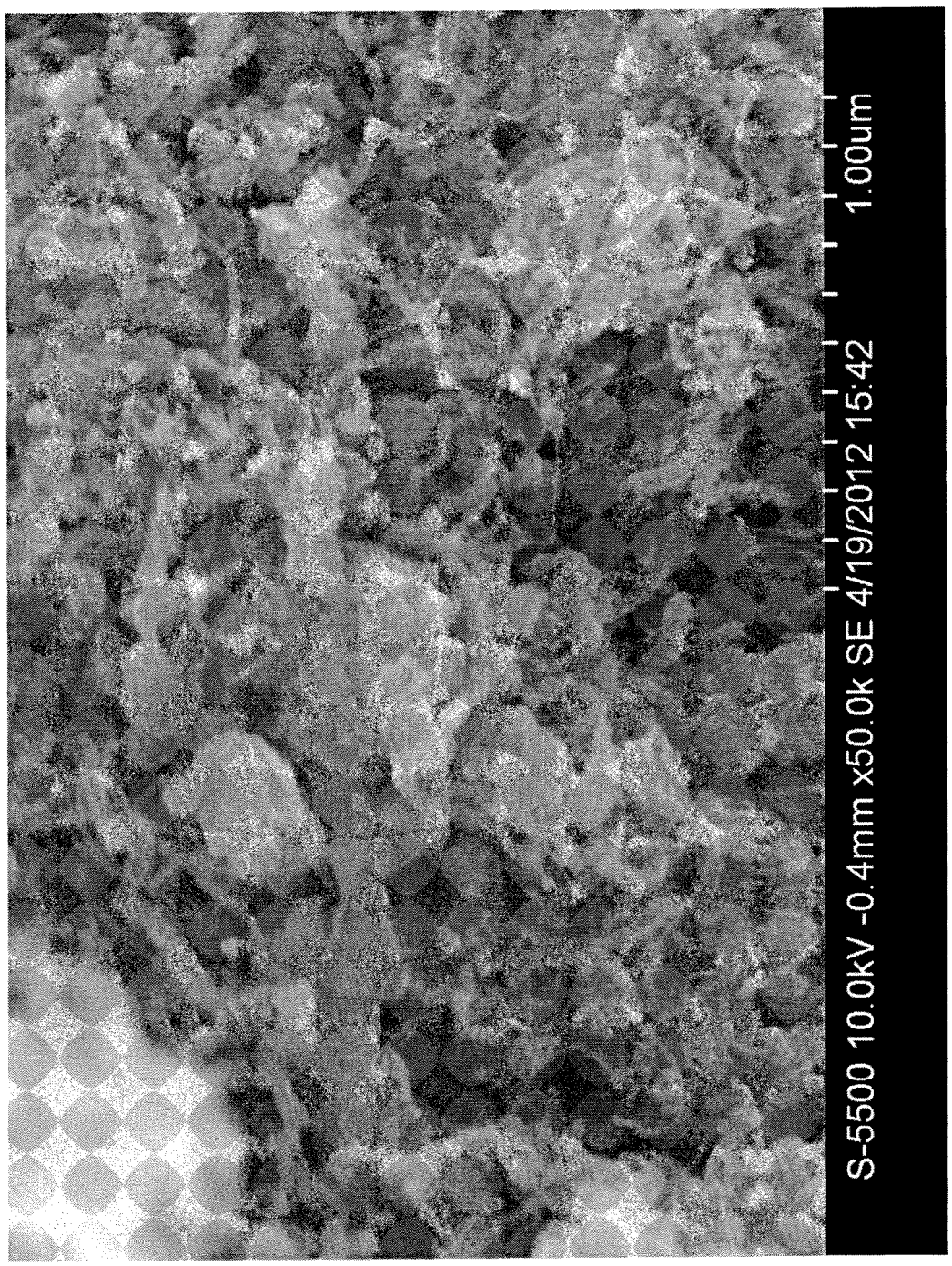
FIG. 3 shows titanium dioxide crystals attached to discrete carbon nanotubes.

A Composition Useful as an Anode Active Material in Lithium Batteries—In situ Synthesis of $TiO_2$-oxidized Carbon Nanotube Composition from Titanium Isopropoxide as a Precursor 0.179 g of carbon nanotubes (originally CNano, grade C-9000) oxidized to about 4% by weight and aspect ratio about 60 is added to 27.3 ml NMP and 2.7 ml RO water and sonicated for 1 hour to obtain a fully exfoliated solution. A 19% v/v solution is prepared by adding 3.41 ml of titanium isopropoxide (Sigma-Aldrich) to 18 ml of isopropanol (Ultra Pure Solutions, Inc.) and is added dropwise with stirring to the exfoliated carbon nanotube dispersion while under sonication. The reaction vessel is then sealed and gently heated to slightly above room temperature for 1 hour. Sonication and a medium stirring speed are maintained over the entire duration of the reaction. The reaction products are obtained by filtering with a Buchner filter under vacuum, washing with ethanol to remove NMP and drying in vacuo to constant weight. An electron micrograph, FIG. 3, shows crystals of titanium dioxide of scale 50-100 nm bound to discrete well-dispersed carbon nanotubes.

What claimed is the following:

1. A composition useful for lithium ion batteries comprising:
   discrete carbon nanotubes having crystals or layers of lithium ion active material attached to their surface, wherein the discrete carbon nanotubes have an aspect ratio of 10 to 500 and oxidation levels from 1% to 15% by weight of the carbon nanotube.

2. The composition of claim 1, wherein the crystals or layers of lithium ion active material comprise tin, silicon, copper, antimony, aluminum, germanium, titanium, or mixtures thereof.

3. The composition of claim 1, further comprising graphene or oxygenated graphene.

4. The composition of claim 3, wherein the weight ratio of graphene to carbon nanotube is in the range of 0.1:99.9 to 99.9:0.1.

5. The composition of claim 1, wherein the carbon nanotubes are present in a weight percentage of 0.1% to 10% by weight of the lithium ion active material.

6. The composition of claim 1, comprising oxidized carbon nanotubes having crystals or layers of lithium ion active materials attached to their surface, wherein the carbon nanotubes are uniformly dispersed without clustering on a dimension scale less than 1 micrometer.

7. The composition of claim 1, comprising uniformly dispersible oxidized carbon nanotubes having crystals or layers of lithium ion active materials attached to their surface.

8. The composition of claim 7, wherein the crystals or layers of lithium ion active materials are chemically attached to the surface of the dispersible oxidized carbon nanotubes.

* * * * *

UNITED STATES PATENT AND TRADEMARK OFFICE
CERTIFICATE OF CORRECTION

PATENT NO. : 8,808,909 B2  
APPLICATION NO. : 14/128392  
DATED : August 19, 2014  
INVENTOR(S) : Bosnyak et al.

Page 1 of 1

It is certified that error appears in the above-identified patent and that said Letters Patent is hereby corrected as shown below:

On the title page item [73] should read:

"Molecular Rebar Design, LLC"

Signed and Sealed this  
Third Day of February, 2015

Michelle K. Lee  
*Deputy Director of the United States Patent and Trademark Office*